(12) United States Patent
Blumenthal et al.

(10) Patent No.: US 8,073,741 B2
(45) Date of Patent: Dec. 6, 2011

(54) METHOD, DEVICE, AND SYSTEM FOR ANALYZING AND RANKING WEB-ACCESSIBLE DATA TARGETS

(75) Inventors: Michael Blumenthal, Johannesburg (ZA); Matthew Rennie, Johannesburg (ZA)

(73) Assignee: Jemstep, Inc., Aventure, FL (US)

( * ) Notice: Subject to any disclaimer, the term of this patent is extended or adjusted under 35 U.S.C. 154(b) by 1166 days.

(21) Appl. No.: 11/769,138

(22) Filed: Jun. 27, 2007

(65) Prior Publication Data

US 2009/0006216 A1    Jan. 1, 2009

(51) Int. Cl.
*G06Q 30/00* (2006.01)
(52) U.S. Cl. ........................................ 705/26.1
(58) Field of Classification Search ............ 705/26, 705/27, 26.1
See application file for complete search history.

(56) References Cited

U.S. PATENT DOCUMENTS

| | | |
|---|---|---|
| 2002/0107842 A1 | 8/2002 | Biebesheimer |
| 2002/0147672 A1 | 10/2002 | Gaini |
| 2003/0028527 A1 | 2/2003 | Crosby |
| 2004/0143508 A1* | 7/2004 | Bohn et al. ............... 705/26 |
| 2006/0241901 A1 | 10/2006 | Hanus |
| 2007/0192312 A1 | 8/2007 | Carnahan et al. |
| 2007/0255696 A1 | 11/2007 | Desbarats |
| 2008/0065569 A1 | 3/2008 | Dutt |
| 2008/0071638 A1 | 3/2008 | Wanker |
| 2008/0114644 A1* | 5/2008 | Frank et al. ............... 705/14 |

FOREIGN PATENT DOCUMENTS

| | | |
|---|---|---|
| WO | WO 2001075680 A | 10/2001 |
| WO | WO 2004010362 A | 1/2004 |

OTHER PUBLICATIONS

Las Vegas Review—Journal. Las Vegas, Nev.: Feb. 28, 1999. p. 4.K http://proquest.umi.com/pqdweb?did=39395253&sid=1&Fmt=3&clientId=19649&RQT=309&VName=PQD.*
European Search Report of European Application No. 08 02 2579.

* cited by examiner

*Primary Examiner* — Mila Airapetian
(74) *Attorney, Agent, or Firm* — Mayback & Hoffman P.A.; Gregory L. Mayback; Katie M. Blakley

(57) ABSTRACT

A method, system, and computer program product for locating a relevant product via a computer network includes receiving, at a client terminal, a search topic from a user and one or more attributes associated with the topic and assigning a rating to at least one of the attributes. A server is used to locate, at one or more information locations, at least two separate instances of the topic and at least two information fields, each field related to one of the instances the topic. Content in each of at least two of the information fields is associated with at least one of the attributes and the content in each of the at least two information fields associated with an attribute is compared against each other. A score to the content of each compared instance of content is assigned based on the comparing. The attributes are prioritized and the located instances of the topic are ranked based on the prioritizing and the score of content associated with the topic.

26 Claims, 13 Drawing Sheets

FIG. 3

Please Define Your Location.

| | | |
|---|---|---|
| Enter Zip: 402 | 90210 | Location by Zip |

Or choose location: 404

| | |
|---|---|
| Country | United States ▼ |
| State | California ▼ — 406 |
| County/Parish | Los Angeles ▼ — 408 |
| City/Town | Beverly Hills ▼ — 410 |

Update

Hide this panel

Select how to rank products

Where do you fit in? | Choose your own Custom Ratings — 516

High Indebtedness ... 502 ... Bit o' Both ... 504 ... High Cash Flow

0 ——————————————————— 100

506 — | 74 | Moderate cash flow placing higher emphasis on fees and benefits. However interest rates are not completely irrelevant for those odd bit purchases. — 508

| Use Scale to Generate Ratings | Let System Choose For Me |
|---|---|
| 510 | 512 |

Hide this panel
514

Select how to rate the cards

| Where do you fit in? | Choose your own Custom Ratings |

On a scale of importance, 0 (unimportant) and 100 (very important), please set the importance as relevant to you.

602c 602b 602a

| Field | 0 — 100 | Value |
|---|---|---|
| Standard APR% — 604a | 0 — 100 | 76 |
| Default APR% — 604b | 0 — 100 | 67 |
| Application and Annual Charges — 604c | 0 — 100 | 64 |
| Grace Periods | 0 — 100 | 82 |
| Penalty Charges — 604e | 0 — 100 | 83 |
| Introductory Benefits | 0 — 100 | 71 |
| Finance Charge | 0 — 100 | 71 |
| Balance Transfer and Cash Advance APR% | 0 — 100 | 84 |
| Balance Transfer and Cash Advance Fees | 0 — 100 | 80 |
| Benefits Rating | 0 — 100 | 21 |
| Rewards Rating | 0 — 100 | 15 |
| Overall Card Rating by Users  602n | 0 — 100 | 75 |

[ Use My Custom Ratings ]   [ Choose For Me ]
606            608

Hide this panel

Search Criteria

| | | |
|---|---|---|
| Location | 1204 — Refine Locations — 1203 | • Refine your location to a country, state, county and city |
| I am interested in | 1205 — All Funds ▼ | |
| | 1208 — All Funds ▼ — 1206 | • Please select fund category and subcategory |
| The Amount I am looking to Invest is | Any Amount ▼ | • Please select the amount you would like to invest |
| Performance Rating | Choose how JemStep gets its rankings | • 3 months |
| Define Filters | Filters for Mandate Restrictions | • No filters have been defined |

Results — 1226

| Rank | Performance 3 Months | Family Name | Family Summary — 1234 | Analyst Rating |
|---|---|---|---|---|
| 1218 → The Top Performing Fund Family in United States | | | | |
| #1 1214 → | 1222 12.319% inc 1228 | 1230 Perkins | • Net Asset Value: 32.39<br>• Consists of 1 funds | ★★★★ 1238<br>info 1240 |

| Rank | Performance 3 Months | Fund Name | Fund Summary — 1236 | Analyst Rating |
|---|---|---|---|---|
| 1220 → The Top Performing Fund in United States | | | | |
| #1 1216 → | 1224 19.995% inc | DirexionLatin America Bull 2X Inv 1232<br>Direxion Funds | • Net Asset Value: 28.411M<br>• Min Investment: $25000.0<br>• Ticker: DX2LX | ★★★★<br>info |

1244 — Where does my Fund Family Rank? | Where does my Mutual Fund rank? — 1250

Please select your family by entering a ticker symbol
Ticker Symbol [____] 1246 [Search Families] — 1248

🔍 Your selected family is not applicable to your search filters

1200

Preferences  User [____]  Password [____] [Login]

1202

1212

1242

| Please Define Ratings | | |
|---|---|---|
| Select Performance Time Period | 3 months ▼ | — 1302 |

Performance Importance Ratings     1306  1304

Appreciation  [0 ——————— 100]  [92]

Yield         [0 ——————— 100]  [75]

1308

Total Return  [0 ——————— 100]  [53]

Please note: Proof of Concept only take appreciation into account

[ Update Ratings ] — 1310

1300

[ Close this panel ]

METHOD, DEVICE, AND SYSTEM FOR ANALYZING AND RANKING WEB-ACCESSIBLE DATA TARGETS

FIELD OF THE INVENTION

The present invention relates generally to internet content location and ranking, and, in particular, to ranking products based on criteria relevant and customized to each particular user and their need for the product.

BACKGROUND OF THE INVENTION

The Internet is a publicly accessible worldwide network of other interconnected computer networks. It consists of millions of smaller domestic, academic, business, and government networks, which together carry various information and services, such as electronic mail, online chat, file transfer, and the interlinked Web pages and other documents of the World Wide Web.

The Internet and the World Wide Web (Web) are not synonymous. While the Internet is a collection of interconnected computer networks, linked by any communicative means, such as copper wires, fiber-optic cables, wireless connections, etc., the Web is a collection of interconnected documents and other resources, linked by hyperlinks and Uniform Resource Locators (URLs). The Web is accessible via the Internet, as are many other services including e-mail, file sharing, and others.

The Web is accessed by navigating to any of a vast amount of "pages," which are each located at a unique address. Each of these pages is able to contain "content," such as graphics, text, video, and sound. Programmers control what content appears on each of these pages. In addition, each page is able to link to other pages through hyperlinks. These other pages are identified by URLs embedded in the hyperlink and contain further content. Due in part to the ease in Web page programming, the Web has experienced a steep exponential increase in the number of pages and, correspondingly, the amount of content available via the Internet.

Compared to traditional information sources, such as encyclopedias and libraries, the World Wide Web has enabled a rapid decentralization of information and data. To help locate this data, "search engines" have been developed by a myriad of software developers. "Search engines" are well known document retrieval systems used to locate information stored on the Web. Through keyword-driven Internet search engines, like GOOGLE®, YAHOO®, ASKJEEVES®, and many others, millions worldwide now have instant access to a vast and diverse amount of online information.

Known search engines work by accepting a user input keyword or keywords with which it uses to perform a comparison to content on Web pages. The comparison can be a basic direct comparison, a complex algorithm, or somewhere in between. Once a specified number of pages are searched, the results are ranked in some order of "relevance," which is a term that has been given several definitions by those that rank information. The results are then displayed in a list, with the determined most "relevant" page being at the top of the list and the least relevant at the bottom.

Unfortunately, determining relevancy is not an exact science. Many search engines define the most relevant site as a site where the keyword appears most frequently. Others determine relevance by the number of other users that select that page when presented with a list of potentially relevant pages. Many other methods are used to attempt to find a page that will most closely fit what the searcher is looking for. Some search engines simply place the page that pays the most money to them as the top choice for the searcher.

However, these relevancy-determining methods are inefficient and inaccurate. For instance, suppose a user is seeking a mutual fund and types in the key words "mutual" and "fund." With all prior-art search engines, the user will not be shown a list of mutual funds with their associated details, but will instead be presented with a list of pages that simply have the words "mutual" and "fund" on their page or in their associated metadata. Similarly, if a user is seeking a credit card, that user, using existing search engines, cannot be given a list of credit cards ranked by their attributes, but will instead be shown a huge list of credit card related sites, which may include credit card issuing companies, credit card customizing companies, stores that accept credit cards, and many others, that are presented to the user based on possibly irrelevant criteria, such as which one pays the highest per click fee or which one generates the most web traffic.

There is currently no way for a searcher to know, out of a list of usually thousands of located Web pages, which page the searcher is seeking. Having to click on each of the non-strategically and inaccurately ranked Web pages located after a search, in order to determine which one is the most relevant, is tedious for the searcher and creates a great deal of frustration.

Therefore a need exists to overcome the problems with the prior art as discussed above.

SUMMARY OF THE INVENTION

A system, method, and computer program product for locating a relevant product via a computer network includes receiving a search topic from a user, where the topic is a particular product that the user is looking for. One or more attributes associated with the topic is then received. The attributes can be properties of the product, such as interest rate of a credit card or certificate of deposit, or can be a property of the user, such as cash flow or debt of the user. A rating is then assigned to at least one of the attributes, where one attribute may be defined as more important than another attribute. Information locations are searched until at least two separate instances of the topic are located. At each of the information locations where an instance of the topic is located, an information field related to one of the instances the topic is located. Next, content in each of at least two of the information fields is associated with at least one of the attributes and the content in a first one of the information fields is scored against the content in a second one of the information fields. The attributes are then prioritized the located instances of the topic are ranked based on the prioritizing.

In accordance with another feature of the invention, the receiving one or more attributes associated with the user comprises receiving inputs from a user, searching data stored during the user's previous session, searching a database of user attributes, and/or system default settings.

In accordance with yet another feature of the present invention, the attributes comprise an income, a credit score, and/or a location.

In accordance with a further feature, an embodiment of the present invention includes displaying by rank, one or more of the plurality of ranked results.

In accordance with one additional feature, an embodiment of the present invention includes updating the rank of the plurality of results in response to receiving a change to a priority of at least one of the attributes.

In accordance with another feature, an embodiment of the present invention includes receiving a user rating of a product and ranking the plurality of results of the searching based at least in part on the user rating.

In accordance with still another feature, the present invention provides a system for locating a relevant product, where the system includes a client computer operable to receive a search topic from a user and receive one or more attributes associated with the user. The system also includes a server communicatively coupled to the client computer and operable to search two or more information locations for the search topic and at least one information field related to the topic. Either the client computer or the server associates at least one of the information fields with at least one of the attributes, prioritizes the attributes, and/or ranks a plurality of results of the searching based on the priority of the attributes.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is a screen shot of a sample page body layout in accordance with an exemplary embodiment of the present invention.

FIG. 4 is a screen shot of a sample location-refinement screen in accordance with an exemplary embodiment of the present invention.

FIG. 5 is a screen shot of a sample page for setting attributes associated with a user in accordance with an exemplary embodiment of the present invention.

FIG. 6 is a screen shot of a sample page for inputting detailed attributes in accordance with an exemplary embodiment of the present invention.

FIG. 7 is a screen shot of a sample search results presentation page in accordance with an exemplary embodiment of the present invention.

FIG. 8 is a screen shot of a product ranking tool in accordance with an exemplary embodiment of the present invention.

FIG. 12 is a screen shot of a sample page body layout for searching and ranking mutual funds in accordance with an exemplary embodiment of the present invention.

FIG. 13 is a screen shot of a sample ratings-definition screen in accordance with an exemplary embodiment of the present invention.

FIG. 17 is a screen shot of a sample page body layout for searching and ranking certificates of deposit in accordance with an exemplary embodiment of the present invention.

DETAILED DESCRIPTION

Figure 1:
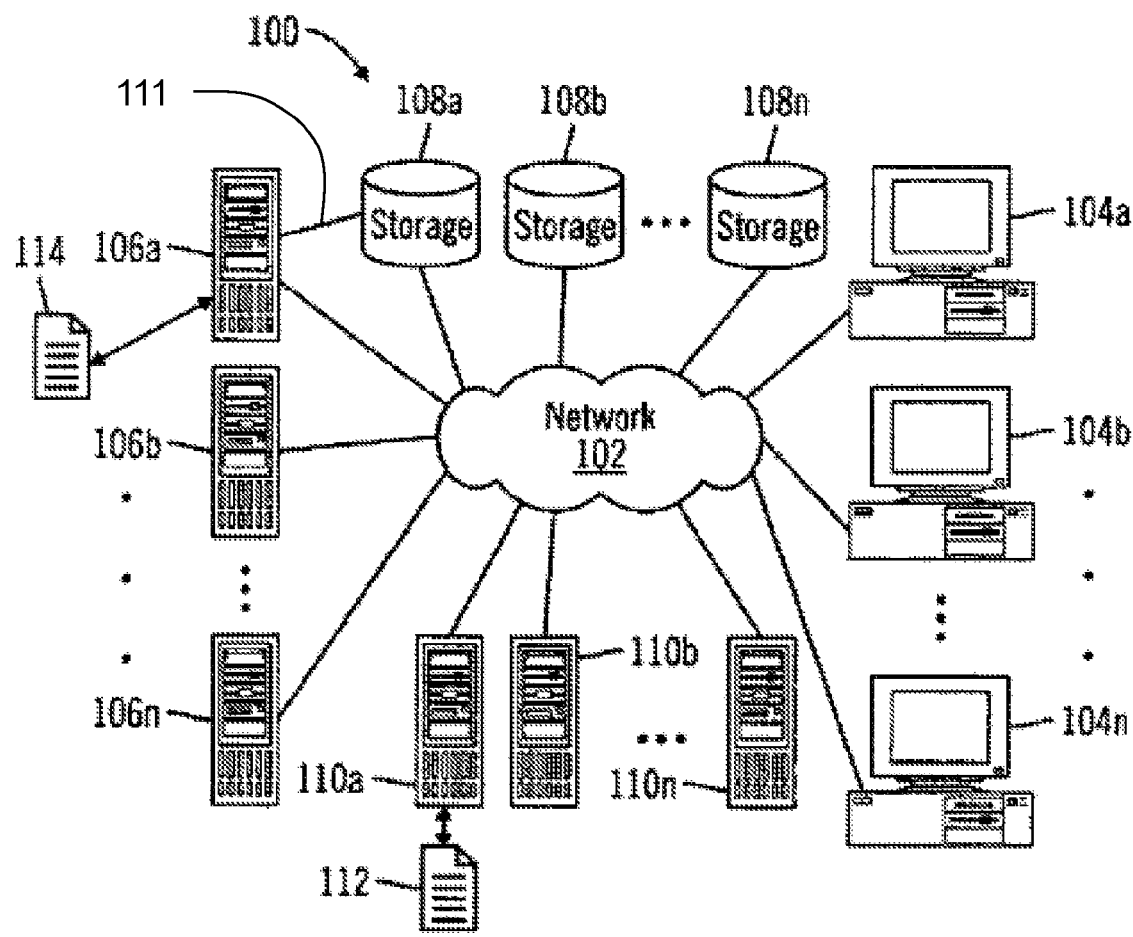
FIG. 1 is a diagrammatic representation of a networked system of data processing components in which the present invention may be implemented.

While the specification concludes with claims defining the features of the invention that are regarded as novel, it is believed that the invention will be better understood from a consideration of the following description in conjunction with the drawing figures, in which like reference numerals are carried forward.

Described now is an exemplary method and hardware platform for intelligently locating a product, where the search for the product is performed over a computer network and the located product is selected by its relevance to a searcher and, more particularly, by its correlation to attributes associated with the searcher. Embodiments of the present invention locate not just web pages that reference, link, or offer a desired product, but returns a list of results ranked by how well the product fits the searcher's needs and the searcher's situation. The term "product," as user herein, is defined broadly and refers not only to physical objects, but also to services, and combinations of products and services, such as credit cards.

Network

With reference now to the figures, FIG. 1 is a pictorial representation of a networked system 100 of data processing components in which the present invention may be implemented. The system 100 includes a network 102, which is the medium used to provide communications links between various devices and computers connected together within the networked data processing system 100. The network 102 provides communication between a plurality of user computers 104a to 104n and a plurality of information servers 106a to 106n. The network 102 is, for example, the internet and provides on-line services. The network servers 106a to 106n manage network traffic such as the communications between any given user's computer 104 and an information server 106. The network 102 may include wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

The user computers 104 are equipped with communications software, including a World Wide Web (WWW) browser such as, for example, the NETSCAPE® browser made by the NETSCAPE COMMUNICATIONS®, INTERNET EXPLORER® made by MICROSOFT®, and FIREFOX® by MOZZILLA®, that allows a searcher to connect and use on-line searching services via the Internet. The software on a user computer 104 manages the display of information received from the servers 106 to the user computer 104 and communicates user's actions back to the appropriate information servers 106 so that additional display information may be presented to the user or the information acted on.

In the depicted example of FIG. 1, servers 106a-n are connected to network 102 along with storage units 108a-n. The storage units 108a-n hold data and are searchable by and accessible to the servers 106a-n via the network 102. As an alternative one or more of the storage units 108a-n may be coupled directly to one of the servers 106a-n, by, for instance, a link 111.

The servers illustrated in FIG. 1, and discussed hereafter, are those of a product or service provider, i.e., a merchant. While the following discussion is directed at communication between shoppers and merchants over the Internet, it is applicable to any information seeker and any information provider on a network. (For instance, the information provider can be a library such as a University library, the public library, or the Library of Congress or other type of information providers.) Information regarding a merchant and the merchant's products or services is stored in one of the databases 108a-n, to which the merchant servers 106a-n have access. This may be the merchant's own database or a database of a supplier of the merchant.

In addition to the servers of individual merchants 106, and other information providers, the system 100 also includes a plurality of search servers 110a-n provided by search service providers, such as GOOGLE®, which maintain full text indexes 112 of the products of the individual merchants 106a-n obtained by interrogating product information databases 114 maintained by the individual merchants. Some of these search service providers, like GOOGLE®, are general purpose search providers while others are topic specific search providers.

Network data processing system 100 may include additional servers, clients, and other devices not shown. In the depicted example, network data processing system 100 includes the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Information Location

Figure 2:
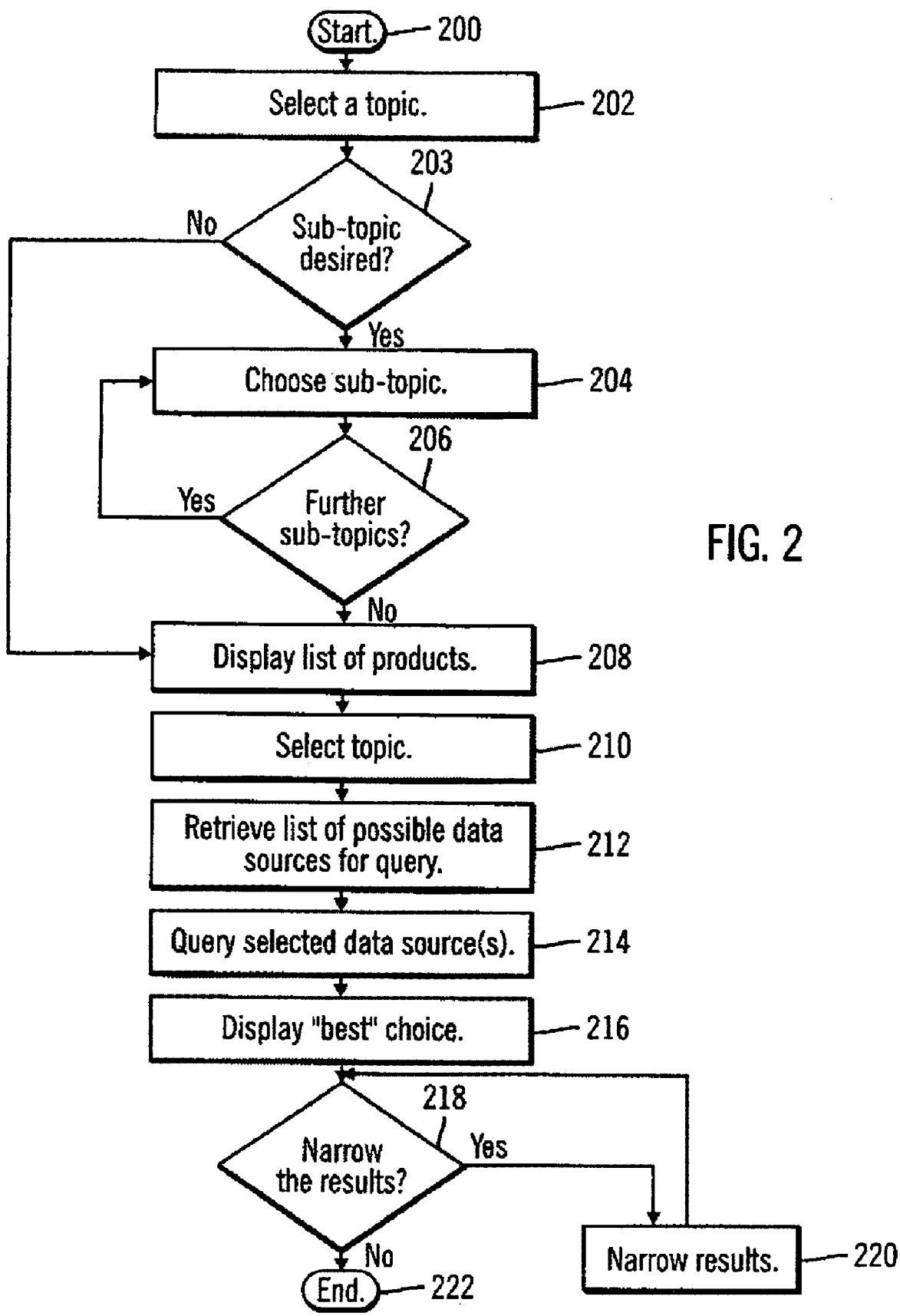
FIG. 2 is a flow diagram showing information location steps in accordance with an exemplary embodiment of the present invention.

The invention, according to an embodiment, is a web-based search application that runs on one of the client devices 104 alone or in conjunction with one or more servers 110, 106. FIG. 2 shows a process flow diagram of the steps for information location performed by an embodiment of the present invention. The process begins at step 200 and moves directly to step 202 where a user selects a topic by typing, clicking from a given list of topics, or any of multiple other ways of selecting a topic. A few exemplary topics include mutual funds, automobiles, real estate, jobs, finance, and others. Once a topic is selected, a list of sub-topics, if applicable (step 203), will then be selectable by the user in step 204. For example, the first topic might be "Finance" and a sub-topic of finance would be "Banking." From there, further sub-topics can be selected until, finally, a product, such as "Credit Card," for example, is chosen.

In step 206, a query is made as to whether further sub-topics are to be selected. If the answer to step 206 is yes, the flow moves back to step 204 and a further sub-topic is selected. If the answer to the query of step 206 is no, the flow continues to step 208 where, now that a topic and a sufficient number of sub-topic levels have been traversed, a list of products is displayed, with each product being selectable by the user. In step 210, a user selects one of the topics.

Once a product is selected, in step 212, a list of possible data sources for the query is retrieved. The system advantageously collects data from multiple sources. These sources are either static or dynamic, online or offline, or both. Some interactions with data sources will need to be dynamic, for example, interacting with the website of an airline to trawl flight availability. Depending on the nature of the search topic, this may be one or a combination of: a local data store where product information is cached and updated periodically either through push or pull techniques; a web service or application programming interface (API), whereby product information is generated dynamically based on variable inputs; or a web application, whereby product information is generated dynamically and requires system interaction with the web site in order to reach a final result. For instance, if the provider of the product offers an online facility to apply, order, or gain more information about the product, the system, in accordance with one embodiment, is able to automatically glean pertinent information from the provider's resources.

The ability for the backend systems to know where to collect data from on a query-by-query basis and to determine if the data is stored locally or is dynamic and global is managed by a data collection component. This component is also responsible for the caching and cache management of data.

In step 214, the data source(s) selected is/are queried. Querying can be performed in several different ways. One example of this is web scraping, which can be performed, for instance, by a semi-trained agent. Web scraping with a semi-trained agent involves a web robot tailored to meet the data presentation formats of a specific provider. This type of robot is most effective with a limited number of providers or in an instance where an intermediary party presents data collected from multiple sources in a similar format. Examples of these would be airline websites, consumer watchdog websites, and financial portals. Scraping occurs after the document object model of the web page has been generated, and is not merely scraping data from raw markup languages.

The training stage of a robot involves processing each seed with a monitor that watches human interactions with the website. Required input variables are linked to object structures which contain user data, for example, unknownPage. Document.Form.INPUT_TEXT_PASSENGER_LASTNAME=FirsName,LastName. The agent simulates the steps for each new query and moves to the specified results page. The results are scraped and combined into the products' attributes and are ready for the ranking function. Table parsing mechanisms are used to extract data cleanly. The data can be periodically updated and structural changes to the source are flagged.

Another data-acquisition method is through use of source discovery and untrained data collection. Source discovery involves the processes used by meta-search engines to locate sources of data which may be relevant. By parsing the results of multiple search engines, the agent attempts to identify possible sources of relevant information and generates a seed list. The agent then visits the seeds and attempts to extract and verify data by one or more of the following:

Visually grouping elements on the page to determine navigation features and page elements which may contain data.

Attempting syntactical word analysis and simple word matching within the visual groups to locate links to data sources and possible product attributes.

If data is tabular, it attempts to scrape the data and match the fields to the relevant tables.

If data is not tabular, but there is an accuracy match above 40%, the agent flags the seed and resulting page for training.

A few other data collection methods include data sharing schemes and pushed or submitted data. By either purchasing data or participating in revenue-sharing schemes, the invention can obtain access to data collected by market researchers or data providers. With pushed or submitted data, providers can submit their own product details to the present invention by using an API.

An example of a query performed by the present invention could include the user's location information and/or the importance of a particular attribute of the product, which can be set by system defaults or through user interaction. In step 216, the system automatically displays the "best" choice for the particular product selected by the user. The best of a particular product is represented, in one embodiment of the present invention, in a multi-tiered structure. For example, tier 1 (row 1) can state "The best CD in the country, based off your criteria is: ExampleBank1 High Yield CD." Tier 2 (row 2) can state, "The best in your state is ExampleBank2 CD." This may be the case if, for example, the state is Alabama, but ExampleBank1 does not have a presence in Alabama. Finally, Tier 3 (row 3) can state "The best CD in your town," (where ExampleBank1+ExampleBank2 do not have a presence) "is ExampleBank3 CD." When the result in tier 2 matches tier 1, the tiers are merged into one, and so on, as in the screenshot FIG. 3.

Determining the "best" item in a list is a task that has been attempted by many developers over the years. The determination of "best," in accordance with embodiments of the present invention, varies depending on many factors. However, the present invention is advantageous over all prior art devices, in that the invention dynamically changes based on the attributes used for the search and the hierarchy of these attributes. For instance, for a product that is relevant to a location, the "best" selection may be based on the best in a country, the best in a particular state, and/or the best in a user's geographical area. Continuing with the example of a credit card as the desired product, the determination of "best" may turn on factors such as:

Annual percentage rate (APR).
Introductory interest rate.
Balance transfer fees.
Transaction fees.
Annual fees.
Card sponsors.
Security measures.
Rewards program.
Consumer rating of the card.
Geographical area in which the institution operates.

Each of these factors is found in information fields associated with the product. Information fields are any data area on a page connected to a product. For a product relevant to time (e.g., stocks, bonds, currencies, etc.), rankings may be based on current statistics, best of the day statistics, monthly or yearly numbers, and others.

In step 218, the user is queried as to whether or not the results should be narrowed. If the answer to the query of 218 is yes, the list can be narrowed, in step 220, automatically or manually, by, for instance, selecting only those products which are offered within a specified distance from the user's location or another defined location. From step 220, the flow moves back to step 218. In step 218, the searcher is given the option to narrow the search results even further. The search may be further narrowed by choosing or adjusting a user attribute, e.g., a poor credit history, or no credit record, or a product attribute, e.g., the card must allow for 0% APR on balance transfers. In addition, a ranking of the importance of attributes defined for the user or the product can factor into the final product ranking. An example search result would be: "Within your region X (may be broken down into country, state, city), Bank Y offers credit card Z which best meets your requirements." This result may be a live result, i.e., displayed directly after a query, or may be tracked by the system over time in order to identify when a more applicable product becomes available. Tracking products over time is advantageous in that it allows the system to notify the user if changes occur to the product, such as a change in interest rate, for instance. If no further narrowing is needed, the process ends at step 222.

In at least one respect, the invention, according to certain embodiments, is a "topical" or vertical search engine which operates on a set of pre-defined data structures representing a product or service offered by a provider or player within an industry. For example, a data structure can be the generic or ontological attributes of a credit card and the institution offering the product. By taking into account the profile data of the user, and/or by being directed by the user's interaction with the inventive engine, the system recommends a best-fit product that meets the user's requirements.

Example Search

The following description and referenced figures provides an example of data location utilizing the present invention. The chosen example product is a credit card, which advantageously provides a complex scenario, which illustrates the various considerations when determining a product's ranking and illustrates how a user would work with the presented information. A credit card is just one example of a search topic and many additional search topics exist within all other industries, such as real estate, investments, telecommunications, healthcare, and many others.

Figure 3:
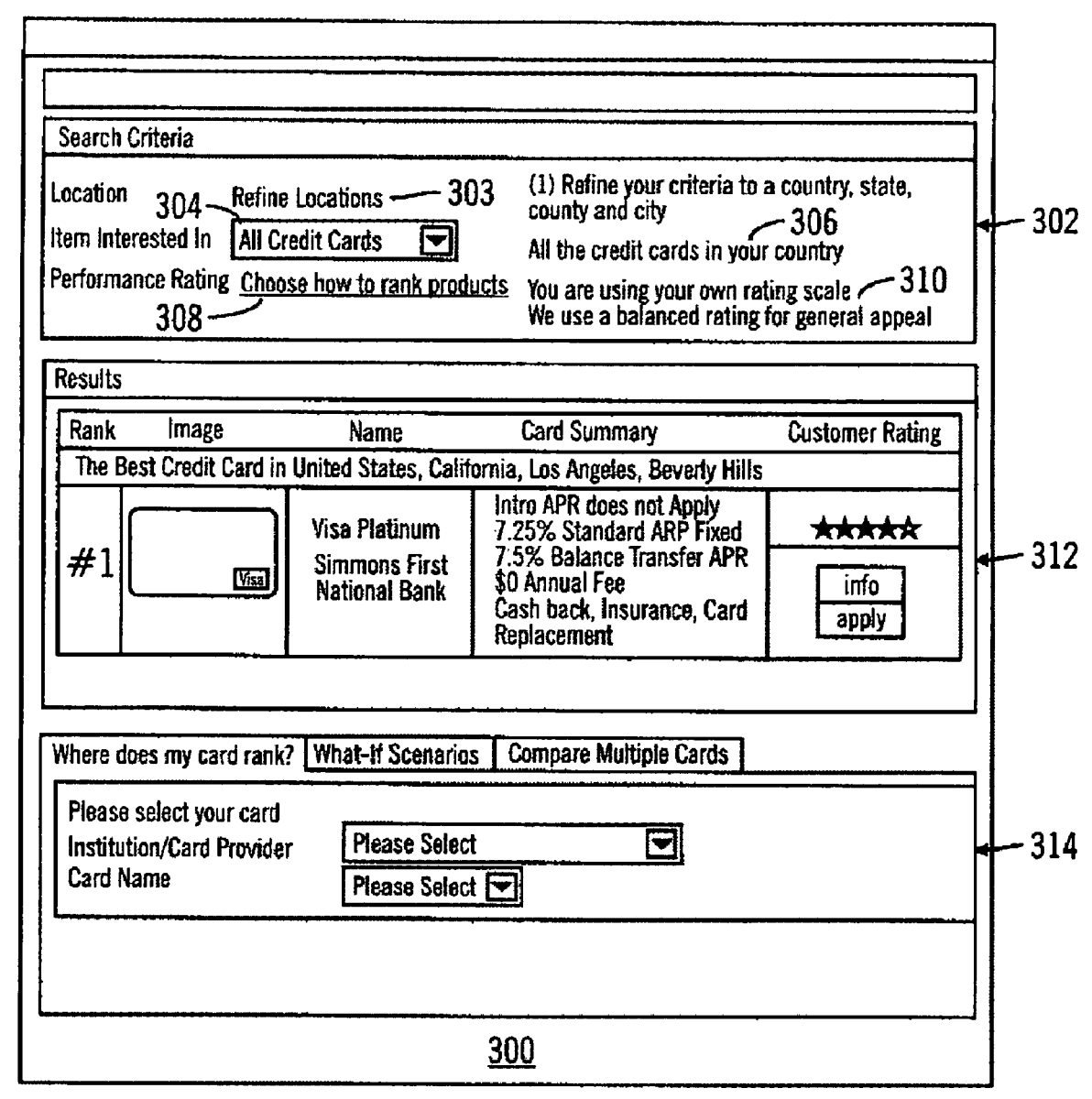

FIG. 3 illustrates one example of a page body layout 300 for interaction with the present invention. The page layout 300 is divided into several sections, the first being a search criteria entry/selection section 302, the second being a results area 312, and the third section 314 allowing the user to see where his/her own or potential card ranks on the scale that selected the best card. It should be noted that the selections shown in the figure are merely exemplary and are not exhaustive of all possible search criteria. In the particular example shown, users can start their search by defining their location in field 303. This definition can be a hierarchical set of choices including, for instance, Country, State, County, City, or the location can be pre-populated if this data has been submitted before either for this product or in any other prior sessions, for any reason. If this is the first interaction with the site and no other location data exists, IP address positioning will be used to refine the location to as low a level as possible.

Field 304 presents a list of fixed variables for the desired type of credit card. The ranking system of the present invention is able to rank all cards of the same type. A few exemplary ranking fields are: All Credit Cards, Regular Credit Cards, Secured Cards, Rewards Card—Air Travel, Rewards Card, Gift/Merchandise, and others.

There is also, in this example, a field 306 that provides help, describes the current selection, and/or provides interaction tips. The field 306 can change depending on the selection made in field 304. The description field 306 provides support to the user and helps the user make the correct selection.

A clickable link is provided in field 308 that selects the ranking method of the present invention. Embodiments of the present invention rank products in a standard three-step process if no selection is made. First, it assigns a score to each attribute of every card, rating its comparison to other cards in the same category of cards, e.g., Rewards Cards. Second, the scores are assigned a weight based upon how relevant each attribute is to the individual user and then the scores are re-scored. Lastly, the scores of each attribute are tallied and, in this example, the cards are scored against each other, with the overall highest score ranked #1.

For the system to gain the importance rating of each attribute, there are three levels of complexity: system default ratings, preset scaled ratings, and in-depth custom ratings. This ranking system applies to all products and will be explained in further detail below. If a user changes from the default ranking system to some other ranking system, a message appears in field 310 indicated this change.

Location Refinement

By refining their location, the users are able to have direct access to products in their geographical region. Although in the credit card example, this is rarely used, as the vast majority of cards are available nationally. However, there are still a significant number of cards which rely on smaller geographical regions.

FIG. 4 shows one embodiment of a location-refinement screen that can be used by a user to specify his/her geographic location so that product searches can be narrowed by including these fields. The location screen 400 is reached by selecting the link in field 303 of FIG. 3. The particular location screen 400 shown in FIG. 4 includes an exemplary standard set of geographic entry boxes, such as zip code 402, country 404, state 406, county 408, and city 410. Drop-down boxes or entry boxes can be used to enter geographic data into the system. The screen 400 can vary, based on, for example, information obtained from the user computer's IP address. For instance, in a location such as the United Kingdom, a postal address is entered instead of a zip code.

Importance Rating

FIG. 5 shows one example of a graphical user interface for setting attributes associated with a user. This screen is reached by selecting the link in field 308 of FIG. 3. By using this panel 500, users can rate, for the credit card example, their own level of indebtedness or cash flow. The present invention can apply preset importance ratings, depending on the selected scale value, to the attributes of the product. These preset ratings are determined by considering general factors that a person who fits into that position on the scale would and should be looking for in a card.

The scale 502 is structured as a series between two values, for instance, 0 and 100. Zero, meaning high indebtedness and 100 meaning high cash flow. Users can drag the scale arrow 504 to find the position which best suites their situation. Value 506 shows the position of the arrow in the scale. Although the positions are grouped into preset categories, the selected value still plays a part in the importance calculation. Field 508 provides a description of the preset category. Once the user has positioned the arrow 504, clicking button 510 will indicate to the system that the scale value 506 should be used as an input for the ranking function. As an alternative, the user can select system defaults by clicking the "Let System Choose For Me" button 512. If no changes are desired, the panel 500 can be hidden by clicking button 514. By clicking on the tab 516 at the top of the screen, users can pull up a screen that allows them to enter custom ratings.

Custom Ratings

FIG. 6 shows a graphical user interface that appears when a user selects the tab 516 of FIG. 5. The resulting screen 600 allows a user to input further detailed attributes into the system. In this example, the attributes are importance rating settings. Users can choose between the scale rating as discussed above and shown in FIG. 5, or the custom ratings shown here.

The custom ratings are selected by moving a slider bar 602*a-n* for each corresponding attribute group 604*a-n*. The slider groups 604*a-n* shown in FIG. 6 may not always be the attributes themselves, but can be low-level groupings of the attributes to allow for a more fine-tuned view. For example, the attribute group Penalty Charges 604*c* applies to the attributes—"late payment fee" and "over the limit" fee. This section is useful for users with a good knowledge of cards.

At the bottom of the screen is two buttons. The first button 606 indicates to the system that the attributes are satisfactorily set and that they should be used to conduct a customized search. The second button 608 tells the system to use system default values to conduct the search. In one embodiment, default data is combined with available profile data and used as inputs for the ranking function. It should be noted that the screens shown in the figures and described here are merely exemplary and that the invention is not limited in anyway to what is shown in the figures or described in these examples.

Results

Figures 7, 8:
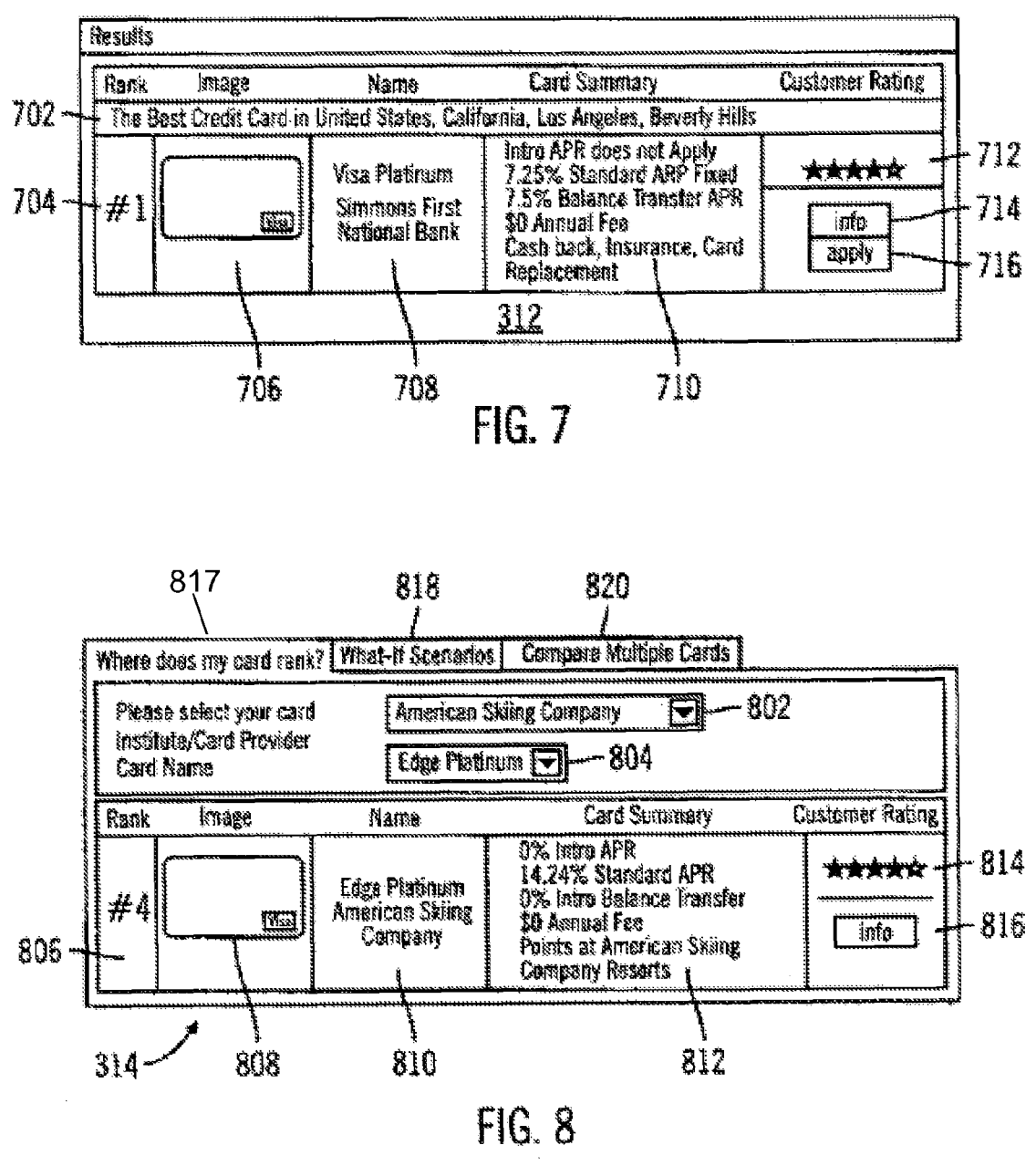

FIG. 7 shows the results of a search performed using the attributes selected in the previous figures and described above. The result screen 312 is typically displayed as soon as a search is activated and returns a result. The result screen 312 has a text field 702 that states, in appropriate circumstances, which product is best given a particular location. With credit cards, this usually displays as a single line item. However, in instances where the #1 product is not available in a user's location, but is in a broader region, two line items will appear. For example, one line item will detail the best product in the country, and the second line item will be the best product in the state, city, and town. This allows the user a broader view beyond their state.

Field 704 shows the ranking of the product compared to all other returned products in the particular search. Field 706 shows an image of the product (if available); otherwise a "no preview" image appears. In the next field 708, the name of the product, in this case, credit card and the institution providing the card, is shown. Field 710 provides a summary of key points the card has to offer. One advantage of the present invention is that the jargon is reduced. The user can interact with the system further to get additional attributes of the product if he/she desires.

In one embodiment of the present invention, a user star-ranking system is implemented. The user-star ranking 712 is a custom satisfaction rating which is collected from users and/or retrieved from consumer watchdog websites. The ranking system scores the attributes of the product and weighs the importance of each as applicable to the user. It has the ability to combine quantitative data as well as qualitative data in order to generate a ranking. In the event the inventive system is unable to collect data for a product, an overall rating for an institution can be factored into its product rating. Ratings are determined by the overall average score for the product; however weightings can vary between the various data sources. For example, ratings collected through the present invention can have a weighting of 1, whereas ratings from less-reputable sites will have a rating of 0.8.

Although the consumer rating of the card is displayed separately, it is still used as part of the ranking function as an attribute. It is also possible that the consumer rating will be featured as a tie-breaker amongst rankings.

The results screen 312 of FIG. 7 also features an "Info" button 714. By clicking the Info button 714, a user can cause a panel to display that will list the individual attributes of the card as compared to all other cards selected on the page. This comparison is shown, for instance, in FIG. 8, which is explained below.

As an additionally advantageous feature, for the credit card application, and for other similar products, an "Apply" button 716 is provided on the results page 312. The Apply button 716, used in conjunction with an online application facility, allows the user to apply for the product online. This function can direct the user to a product provider's web page or can call up an information submission screen(s), which can be used to collect information and then forward the information to a product provider's business, either electronically or in tangible form.

Further User Interaction

In one embodiment, the user is able to select, through use of field 314 (in graphical user interface 300 shown in FIG. 3), their existing credit card and find out where it ranks on the scale which led to the selection of card #1 being found. It also gives hypothetical expenditure examples, for instance, if a user were purchasing on one card as opposed to another. Section 314 is shown in greater detail in FIG. 8.

Selecting a product can be performed by first selecting, on a first tab 817, through an input field 802, the provider and then narrowing down, through another input field 804, to the individual product. The user's choice of product, in this case a credit card, is displayed in fields 806-816. Field 806 shows the card's ranking against other cards in its class. Fields 808 and 810 show product identification text and, if available, an image of the product. Field 812 provides a summary of the card's attributes. A consumer rating of the card is shown in field 814. By selecting the Info button 816, a screen can be reached, which shows more detailed attributes of the card.

In one embodiment, what-if scenarios are available and allow a user to convert the card attributes into dollar terms based on the user's scenario. What-if scenarios can be entered by clicking on tab 818. These scenarios can be a powerful tool for the user, as it allows him/her to actually simulate different financial situations. If the invention were used, for instance, with mutual funds, it would allow the user to enter different scenarios pertinent to mutual funds, such as varying interest rates, terms, tax rates, etc.

A third available tab 820 allows the user to select a comparison of multiple credit cards. In this function, selected cards are compared attribute by attribute in a detailed table. Further information can be provided to the user by either furnishing contact details to the provider or sending a request to the provider for product brochures and other information.

Interaction Summary

Figure 9:
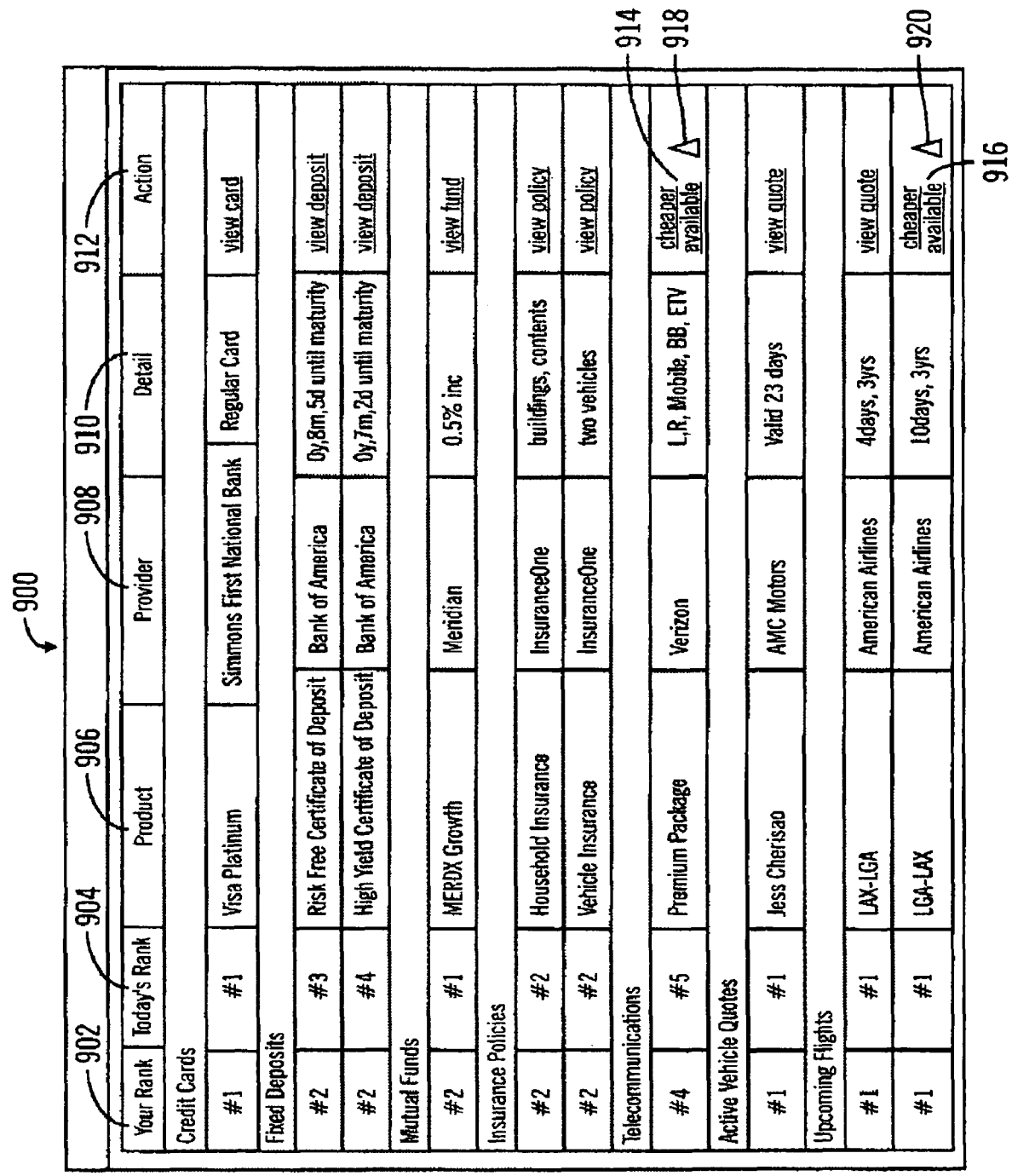
FIG. 9 is a screen shot of an interaction summary page in accordance with an exemplary embodiment of the present invention.

FIG. 9 shows an interaction summary page 900. The interaction summary page 900 allows registered users to gain a "bird's-eye" view of all their flagged interactions with the present invention. At a glance, the user will be able to determine the status of their investments, facilities, policies, purchases, etc. within the general marketplace as a whole. As an additional feature, the present invention provides an alerting system, which flags the user as to new developments within their products.

The interaction summary page 900 can form a part of a landing page for registered users, and be available through various web feed formats, such as RSS. RSS is used to publish frequently updated content such as blog entries, news headlines, or podcasts. An RSS document, which is called a "feed," "web feed," or "channel," contains either a summary of content from an associated web site or the full text. RSS makes it possible for people to keep up with their favorite web sites in an automated manner that is easier than checking them manually. Users have the ability to use their own web aggregators running on either their desktop or web blogs to pull this summary 900 down and gain a perspective of their affairs without having to go through the arduous process of navigating to the website and logging in. All further interactions can, therefore, be conducted on the website.

FIG. 9 shows several columns 902-912 containing exemplary fields that can appear in the summary page 900. For example, column 902 contains the rank of each product at the time the user added it to the summary and column 904 contains fields that show the rank of the product as it applies at the time the summary was downloaded. The importance ratings are stored in the users profile and are retrieved when determining that day's ranking. Column 906 shows the product name and column 908 lists the provider of the product. Column 910, in this example, shows important information about the status of each product. In the summary screen 900 of FIG. 9, a link to other portions of the present invention is provided in column 912 to allow for further interaction with the product.

The marketplace is an evolving entity. Decisions that are made today are not necessarily the best tomorrow. The present invention assists users in making decisions which are ongoing and continually relevant. This is achieved by continually searching for the "better deal" based on the user's requirements. If the system is able to recommend a more appropriate service provider or product, the user is notified via a predefined communication channel. For instance, as is shown in two of the fields, 914 and 916, of column 912, a warning indicator 918 and 920, respectively, appears when conditions specified by the user are met. These warnings include an early and a late warning. The late notifier notifies a user if a better rate or price becomes available. The early notifier notifies the user of upcoming product events or requirements, e.g., when funds are near their maturity date.

Server

Figure 10:
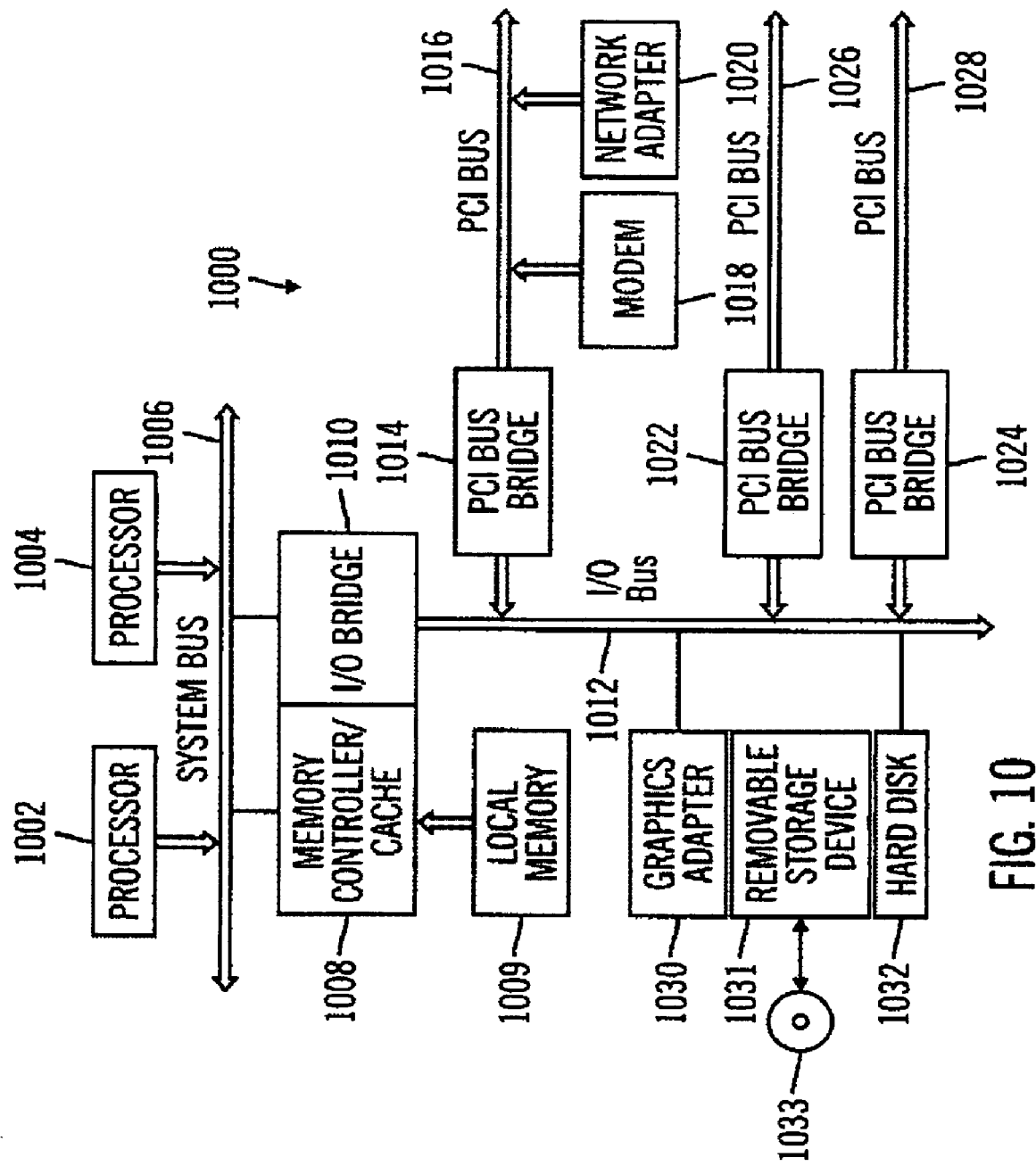
FIG. 10 is a block circuit diagram of a data processing system that may be implemented as a server computer system in accordance with an exemplary embodiment of the present invention.

Referring to FIG. 10, a block diagram of a data processing system that may be implemented as a server, such as server 106 and/or server 110 in FIG. 1, is depicted in accordance with one embodiment of the present invention. Data processing system 1000 may be a symmetric multiprocessor (SMP) system including a plurality of processors 1002 and 1004 connected to system bus 1006. Alternatively, a single processor system may be employed. Also, connected to system bus 1006 is memory controller/cache 1008, which provides an interface to local memory 1009. I/O bus bridge 1010 is connected to system bus 1006 and provides an interface to I/O bus 1012. Memory controller/cache 1008 and I/O bus bridge 1010 may be integrated as depicted. The processor 1002 or 1004 in conjunction with memory controller 1008 controls what data is stored in memory 1009. The processor 1002 or 1004 can also work in conjunction with any other memory device or storage locations, such as storage areas 108*a-n*, to serve as a monitor for monitoring data being stored and/or accessed on the data storage areas 108*a-n*.

Peripheral component interconnect (PCI) bus bridge 1014 connected to I/O bus 1012 provides an interface to PCI local bus 1016. A number of modems may be connected to PCI bus 1016. Typical PCI bus implementations will support four PCI expansion slots or add-in connectors. Communications links to network computers 104*a-n* in FIG. 1 may be provided through modem 1018 and network adapter 1020 connected to PCI local bus 1016 through add-in boards.

Additional PCI bus bridges 1022 and 1024 provide interfaces for additional PCI buses 1026 and 1028, from which additional modems or network adapters may be supported. In this manner, data processing system 1000 allows connections to multiple network computers. A memory-mapped graphics adapter 1030 and hard disk 1032 may also be connected to I/O bus 1012 as depicted, either directly or indirectly.

Those of ordinary skill in the art will appreciate that the hardware depicted in FIG. 10 may vary. For example, other peripheral devices, such as optical disk drives and the like, also may be used in addition to or in place of the hardware depicted. The depicted example is not meant to imply architectural limitations with respect to the present invention.

In this document, the terms "computer program medium," "computer usable medium," and "computer readable medium" are used to generally refer to media such as main memory 1009, removable storage drive 1031, removable media 1033, hard disk 1032, and signals. These computer program products are measures for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may include computer readable information in a transitory state medium such as a network link and/or a network interface, including a wired network or a wireless network, that allow a computer to read such computer readable information.

Computer programs (also called computer control logic) are stored in memory. Computer programs may also be received via communications interface 1016. Such computer programs, when executed, enable the computer system to perform the features of the present invention as discussed herein. In particular, the computer programs, when executed, enable the processor 1002 and/or 1004 to perform the features of the computer system. Accordingly, such computer programs represent controllers of the computer system.

Client Device

Figure 11:
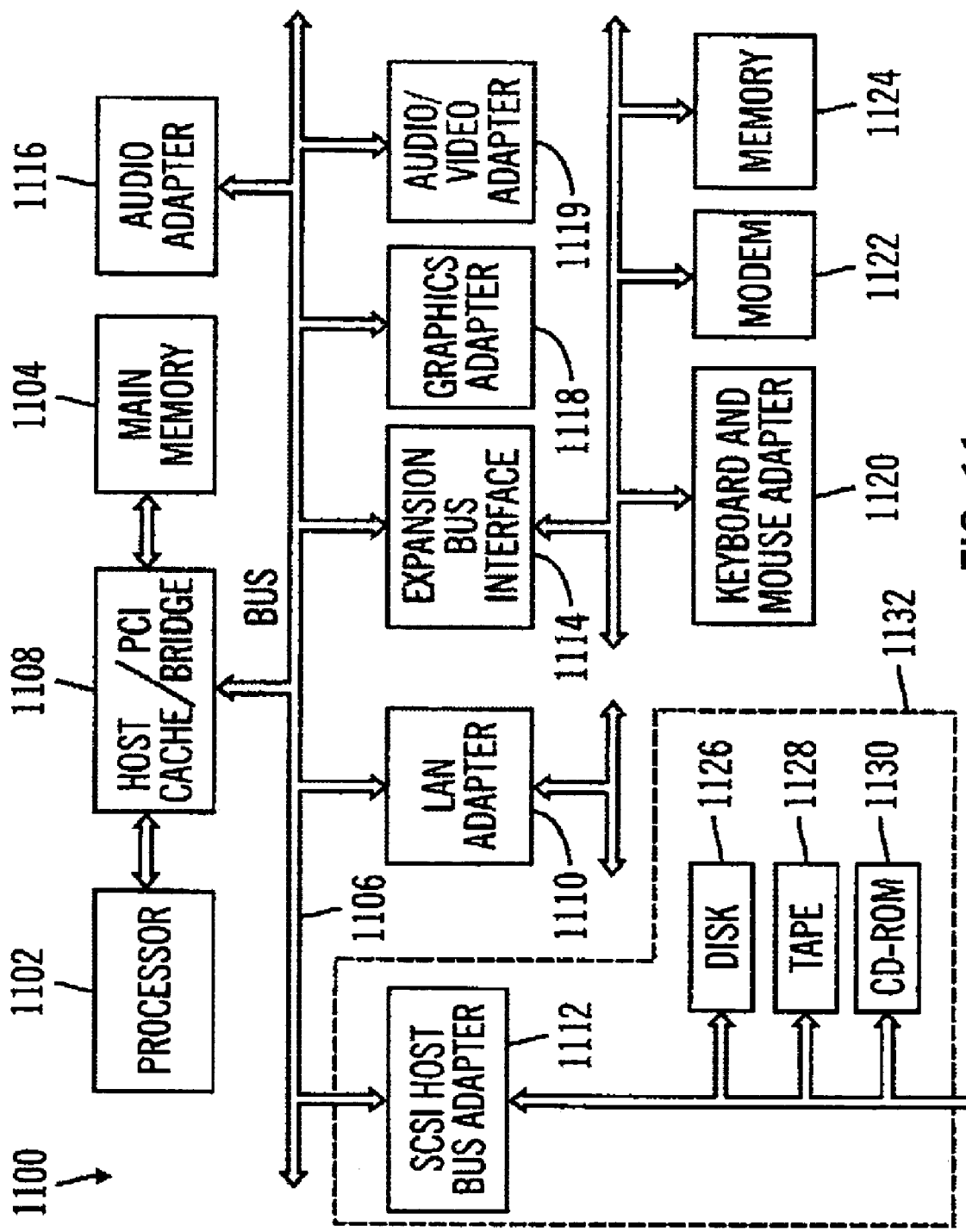
FIG. 11 is a block circuit diagram of a data processing system that may be implemented as a client computer system in accordance with an exemplary embodiment of the present invention.

With reference now to FIG. 11, a block diagram illustrating a data processing system is depicted in which the present invention may be implemented. Data processing system 1100 is an example of a client computer 104. Data processing system 1100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 1102 and main memory 1104 are connected to PCI local bus 1106 through PCI bridge 1108. PCI bridge 1108 also may include an integrated memory controller and cache memory for processor 1102. Additional connections to PCI local bus 1106 may be made through direct component interconnection or through add-in boards. In the depicted example, local area network (LAN) adapter 1110, SCSI host bus adapter 1112, and expansion bus interface 1114 are connected to PCI local bus 1106 by direct component connection. In contrast, audio adapter 1116, graphics adapter 1118, and audio/video adapter 1119 are connected to PCI local bus 1106 by add-in boards inserted into expansion slots. Expansion bus interface 1114 provides a connection for a keyboard and mouse adapter 1120, modem 1122, and additional memory 1124, for example. Small computer system interface (SCSI) host bus adapter 1112 provides a connection for hard disk drive 1126, tape drive 1128, and CD-ROM drive 1130, for example. Typical PCI local bus implementations will support three or four PCI expansion slots or add-in connectors.

An operating system runs on processor 1102 and is used to coordinate and provide control of various components within data processing system 1100 in FIG. 11. Each client is able to execute a different operating system. The operating system may be a commercially available operating system, such as WINDOWS XP®, which is available from Microsoft Corporation. A database program such as ORACLE® may run in conjunction with the operating system and provide calls to the operating system from JAVA® programs or applications executing on data processing system 1100. Instructions for the operating system, the object-oriented operating system, and applications or programs are located on storage devices, such as hard disk drive 1126, and may be loaded into main memory 1104 for execution by processor 1102.

Those of ordinary skill in the art will appreciate that the hardware in FIG. 11 may vary depending on the implementation. Other internal hardware or peripheral devices, such as flash ROM (or equivalent nonvolatile memory) or optical disk drives and the like, may be used in addition to or in place of the hardware depicted in FIG. 11. Also, the processes of the present invention may be applied to a multiprocessor data processing system.

As another example, data processing system 1100 may be a stand-alone system configured to be bootable without relying on some type of network communication interface, whether or not data processing system 1100 includes some type of network communication interface. As a further example, data processing system 1100 may be a Personal Digital Assistant (PDA) device, which is configured with ROM and/or flash ROM in order to provide non-volatile memory for storing operating system files and/or user-generated data.

The depicted example in FIG. 11 and above-described examples are not meant to imply architectural limitations. For example, data processing system 1100 also may be a notebook computer or hand-held computer in addition to taking the form of a PDA. Data processing system 1100 also may be a kiosk or a Web appliance.

Mutual Funds

FIGS. 12-16 show another non-limiting example of a use for the present invention. The particular example shown in FIGS. 12-16 is related to mutual funds. FIG. 12 illustrates one example of a page body layout 1200 for interaction with the present invention. The page layout 1200 is divided into several sections, the first being a search criteria entry/selection section 1202, the second being a results area 1212, and the third section 1242 allowing the user to see where his/her own or potential mutual fund or family of funds rank on the scale that selected the best fund or family of funds. It should be noted that the selections shown in the figure are merely exemplary and are not exhaustive of all possible search criteria. In the particular example shown, users can start their search by defining their location in field 1203. This definition can be a hierarchical set of choices including, for instance, Country, State, County, City, or the location can be pre-populated if this data has been submitted before either for this product or in any other prior sessions, for any reason. If this is the first interaction with the site and no other location data exists, IP address positioning will be used to refine the location to as low a level as possible.

Fields 1204 and 1205 present lists of fixed variables for the desired type of fund. Field 1204 is a category and field 1205 is a subcategory of the family and fund. In one embodiment, the drop down choices for the category 1204 include, for example: Bond Funds, Hybrid Funds, International Stock-funds, and U.S Stock funds. The subcategories in drop down box 1205 include, for example, Large Blend and Large Growth funds.

Field 1206 allows a user to specify the amount that they wish to invest. This field can be used to filter funds by their required initial investment amount, or that use an investment amount as a criteria for some factor related to the fund.

A clickable link is provided in field 1208 that selects the ranking method of the present invention. Embodiments of the present invention rank products in a standard three-step process if no selection is made. First, it assigns a score to each attribute of every fund (or whatever product is the subject of the search), rating its comparison to other funds in the same category of funds. Second, the scores are assigned a weight based upon how relevant each attribute is to the individual user and then the scores are re-scored. Lastly, the scores of each attribute are tallied and, in this example, the funds are scored against each other, with the overall highest score ranked #1.

For the system to gain the importance rating of each attribute, there are three levels of complexity: system default ratings, preset scaled ratings, and in-depth custom ratings. This ranking system applies to all products. FIG. 13 shows a graphical user interface screen 1300 that appears once a user clicks on the link 1208. Similar to the credit card example, this screen dictates how the present invention will rate the funds under consideration.

The first selectable field of FIG. 13 is field 1302, which defines the time period for consideration. The invention will track a fund or family of funds over the period selected to determine a yield or other attribute. The following 3 fields, 1304, 1306, and 1308, are exemplary attributes of a mutual fund that might be useful in comparing two or more funds. The first field 1304 has a slider for selecting an importance rating for the attribute of appreciation. The second field 1306 has a slider for selecting an importance rating for the attribute of yield. The third field 1308 has a slider for selecting an importance rating for the attribute of total return. After setting the importance ratings of one or more of the fields, their values are input to the system by clicking on the "update ratings" button 1310 at the bottom of the screen 1300.

Figure 14:
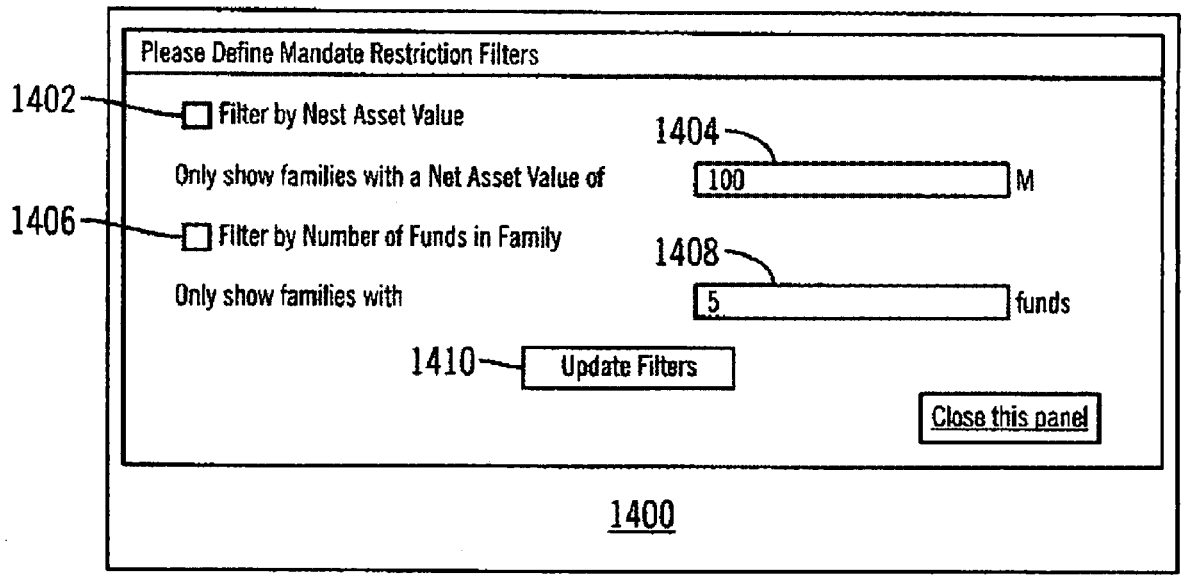
FIG. 14 is a screen shot of a filter settings screen in accordance with an exemplary embodiment of the present invention.

Returning back to FIG. 12, field 1210 is a clickable link to determine how the present invention filters the funds. An exemplary graphical user interface 1400 that would appear after a user clicks link 1210 is shown in FIG. 14. This screen 1400 can be used by, for example, investors who have to invest as per a mandate established by their investing organization. The screen 1400 has a checkbox 1402 that indicates to the system that the user wishes to filter the families by the total net asset value of the family. If this checkbox 1402 is checked, the system will use the value in that user entry field 1404, which indicates to the system the net asset value by which to filter funds. A second checkbox 1406 indicates to the system that the user wishes to filter families of funds by how many funds each family of funds possesses. If this checkbox 1406 is checked, the system will filter based on the number of funds indicated in box 1408. A button 1410, upon being clicked, updates the filters and refreshes the rankings.

The next main section 1212 of FIG. 12 shows the number one family of funds 1214 and the number one fund 1216. The results shown in fields 1214 and 1216 are typically displayed as soon as a search is activated and returns a result. Each of the fields 1214 and 1216 have a text field 1218 and 1220, respectively, that states, in appropriate circumstances, which product is best given a particular location.

In the next fields, 1222 and 1224, a fund family's performance and a fund's performance, respectively, over a period of time, is shown. This period of time is identified in the header 1226 and 1228 above the fields 1222 and 1224, respectively. An identifier of the fund family and family of funds is shown in fields 1230 and 1232, respectively. Fields 1234 and 1236 provide a summary of key aspects of the number one ranked fund family and fund, respectively. These number one ranked products may preferably conform to the location information entered into field 1203. One advantage of the present invention is that the jargon is reduced. The user can interact with the system further to get additional attributes of the product if he/she desires.

In one embodiment of the present invention, an analyst star-ranking system is implemented. The analyst star-ranking 1238 is a custom satisfaction rating which is collected from analyst and/or retrieved from other information sources. The ranking system scores the attributes of the product. It has the ability to combine quantitative data as well as qualitative data in order to generate a ranking. In the event the inventive system is unable to collect data for a product, an overall rating for an institution can be factored into its product rating. Ratings are determined by the overall average score for the product; however weightings can vary between the various data sources. For example, ratings collected through the present invention can have a weighting of 1, whereas ratings from less-reputable sites will have a rating of 0.8. Although the analyst rating of the fund is displayed separately, it can still used as part of the ranking function as an attribute. It is also possible that the analyst rating will be featured as a tie-breaker amongst rankings.

The results field 1212 also features an "Info" button 1240. By clicking the Info button 1240, a user can cause a panel to display that will list the individual attributes of the fund as compared to all other funds selected on the page.

Figure 15:
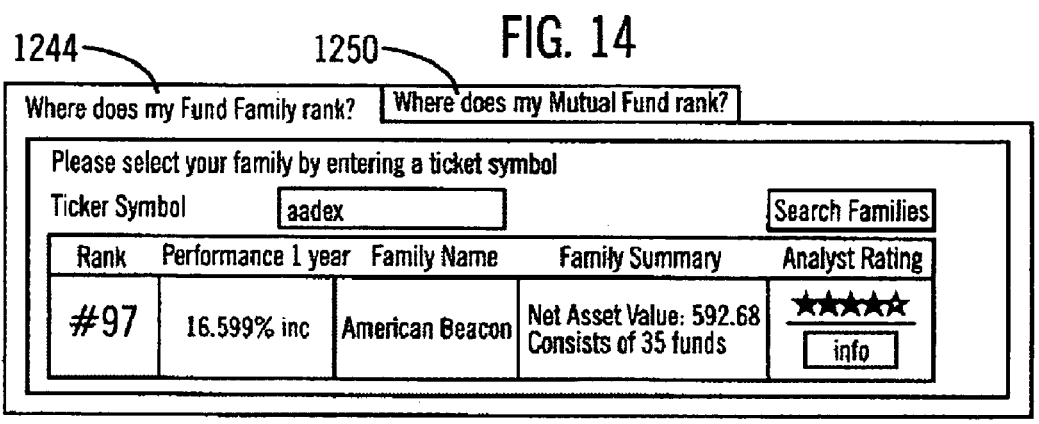
FIG. 15 is a screen shot of a sample page body layout for searching and ranking mutual funds in accordance with an exemplary embodiment of the present invention.

Ranking field 1242 provides two tabs. The first tab 1244, when selected, allows a user to enter a fund family identifying code in the field 1246. This section ranks the user's family which he/she has invested in. These rankings are continually updated when the user changes the filter or scale requirements. This is so the user has a view of his own fund ranking as it arises within the changing criteria. Upon depressing a button 1248, a screen similar to the one shown in FIG. 15 is shown to the user.

Figure 16:
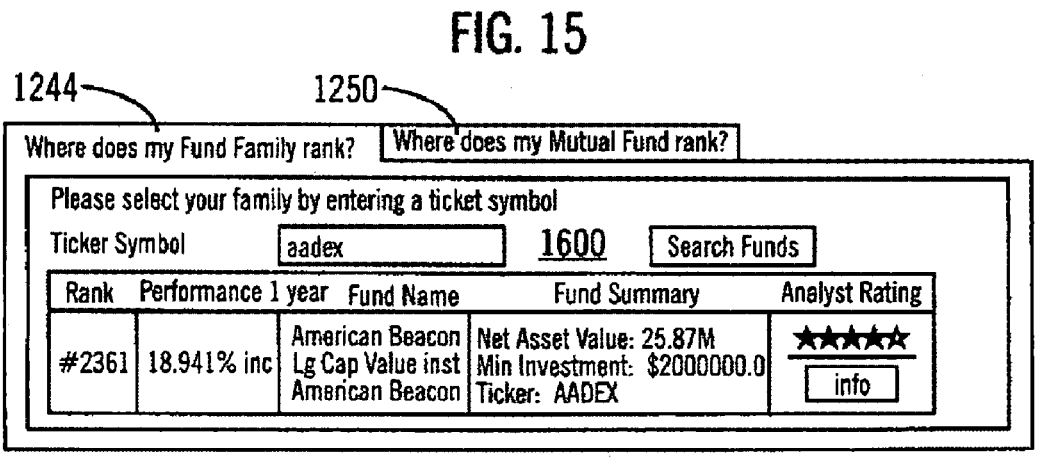
FIG. 16 is a screen shot of a sample search results presentation page for mutual fund families in accordance with an exemplary embodiment of the present invention.

A second tab 1250 brings up a screen similar to screen 1600 shown in FIG. 16. Screen 1600 allows users to see the individual funds performance. Further interaction in this section will allow the user to track the performance of the fund over time at set intervals. The performance can be presented with a ranking, as well as the percentage change.

Certificates of Deposit

Figure 17:
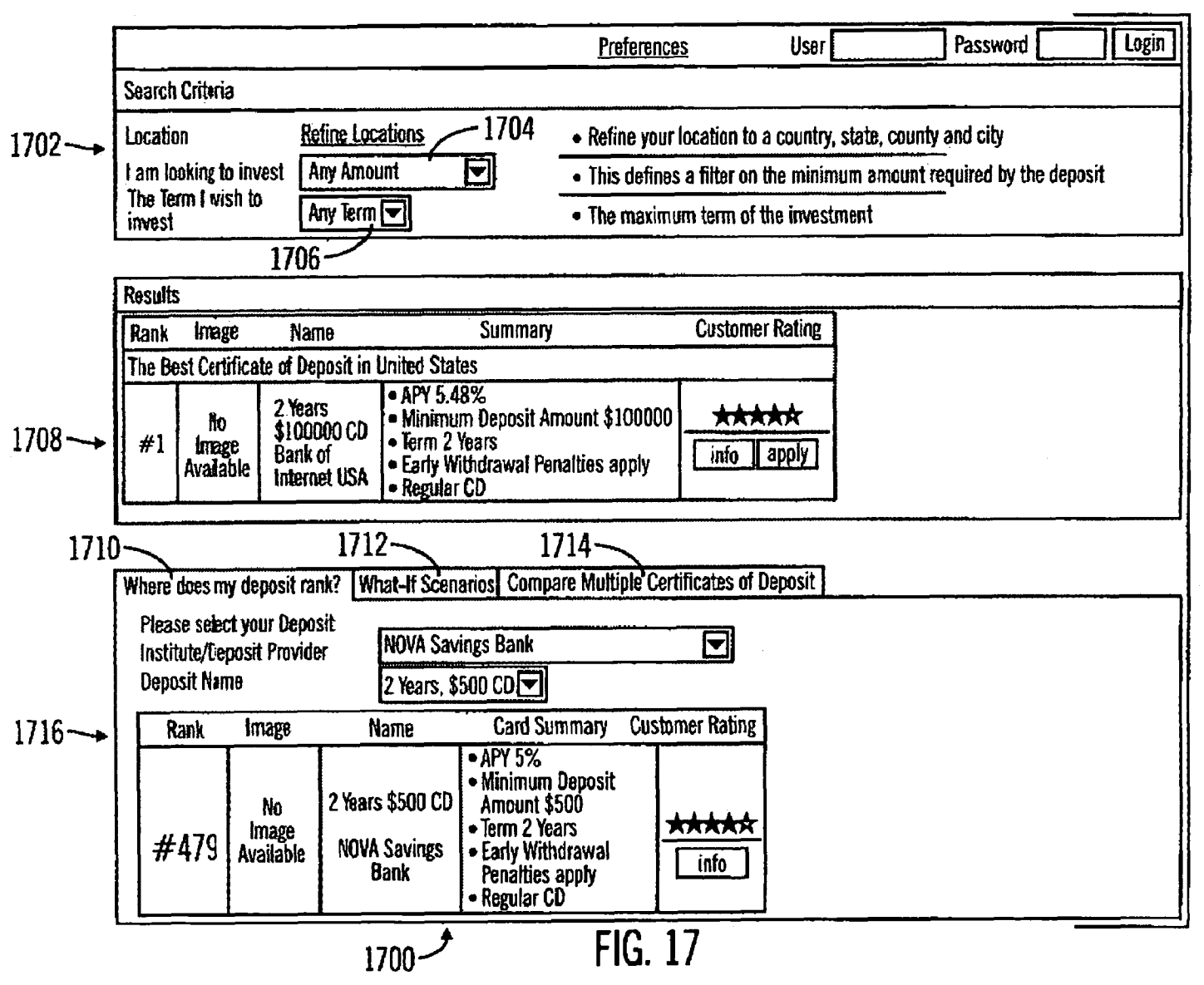

FIG. 17 shows another exemplary use of the present invention, which is to analyze certificates of deposit (CDs). The screen 1700 is similar to those examples described above and shown in the figures. FIG. 17 has a first field 1702 for inputting CD criteria, such as amount to invest 1704 and investment term 1706. The screen 1700 has a results section 1708 for presenting the number one CD and a ranking and comparing section 1716. The ranking and comparing section 1716 has a first tab 1710 that, when selected, allows a user to rank a particular CD against all others in a comparison group. A second tab 1712 allows the user to engage in what-if scenarios. Finally, a third tab 1714 allows a user to compare multiple CDs against each other.

The graphical user interface 1700 shown in FIG. 17 is not meant to be limiting. The present invention is not necessarily required to have all of the features shown and may also have additional features.

Summary

The present invention is an impartial and objective web application for intelligently locating a product, where the search for the product is performed over a computer network that is accessible to users through any internet access device, including, personal computers, laptops, mobile telephones, and many others. The invention accepts predefined and/or open-ended search criteria and user profile data and responds to user direction to access one or many data sources in order to identify the optimal search candidate within a finite set of possible candidates constructed for a predefined problem. The located product is selected by its relevance to a searcher and, more particularly, by its correlation to attributes associated with the searcher. Embodiments of the present invention locate not just web pages that reference, link, or offer a desired product, but returns a list of results ranked by how well the product fits the searcher's needs and the searcher's situation.

The present invention, according to one embodiment, produces a ranking of relevant products by receiving a search topic from a user and one or more attributes associated with the user. The attributes are factors, such as demographics or situational data specific to the user. The invention then searches multiple information locations for the search topic and also searches at least one information field connected to each information location and associated with the topic. The invention then associates content in at least one of the information fields with at least one of the attributes. By "associating," the invention is making a logical correlation between the content of one of the information fields and one of the attributes input by the user. This correlation may not be direct. For example, the user may enter the "attributes" of his total debt and his income. The invention may "associate" these attributes to an information field containing a maximum limit of a loan and also to a minimum credit score. The user's credit score can be calculated by the present invention based on debt vs. income. The information fields are then prioritized, thereby creating a hierarchy of factors based on importance or relevance. For instance, the user may wish to find a credit card with the highest credit limit so he can move debt, rather than worry about an interest rate. Based on the prioritization, the products are ranked against each other.

Embodiments of the present invention build a comprehensive profile of users by monitoring user click-through events and recommendation acceptance. This comprehensive set of mine-able data increases the invention's ability to recommend suitable products and may lead to a sustainable source of income.

The system has the potential to cause providers to make their products more competitive and attractive to consumers by offering quantifiable benefits. Although qualitative aspects of a product are not disregarded (users are allowed to rate this separately), the recommendation of which product(s) best fit(s) the user's profile and search requirements is presented. This, coupled with the ability to present recommendations of products far beyond the average consumer's top-of-mind awareness, is a great leveller of the playing field which provides a huge advantage to consumer decision making.

The present invention is able to affect multiple industries, which included investments, borrowing, insurance, travel, healthcare, telecommunications, education, and many others.

The present invention provides many advantages over previously-known search engines. For one, the results (rankings) are particular to the user conducting the search and have no bearing on other users of the system. Specifically, where most search engines take into account the number of other users that navigate to a page, the present invention makes each search tailored only to the user conducting the search. The present invention rates products and services on their attributes and the relevance of each attribute to the searching user's profile.

The invention is impartial and objective because it is based on published, industry-specific data. Queries processed by the system are those which are directed at a particular industry in order to find a quantifiable result. This could be a financial rate comparison, top-rated service provider, or a product which best meets the needs of the user. The result of a query is impartial as the entity providing the inventive service gains no financial reward from making its recommendation.

Furthermore, the knowledge base and data repository of the present invention is built on published information (e.g., web data) and/or data that is compiled by a trustworthy, impartial, third party. The operator of the present invention is not required to obtain subscriptions from service providers nor prioritize results based on any financial incentives. Advantageously, embodiments of the present invention create an automated "live" data repository which is continuously up-to-date and actively monitoring changes in the marketplace and seeking new providers and products.

Web users are generally familiar with formulating natural-language queries in order to receive a list of possible answers, then manually filtering the results in order to locate the most relevant answer. However, the ability to formulate an effective natural language query depends on the level of sophistication a user has within a particular field.

Through use of the present invention, users are guided through a question/answer-based expert system assists the user in narrowing the query and filtering results to find the most relevant and beneficial single result within the target industry. The expert systems are industry-specific and developed in conjunction with experts operating in that particular field. This allows the present invention to provide a service to both sophisticated and unsophisticated users alike, allowing both to achieve the best possible result.

One further advantage is that the present invention is able to present the most relevant result only. In such an embodiment, the ultimate goal is to offer the single best-suited result based on the user's query criteria and requirements, i.e., one query equals one result.

Additionally, where possible and/or applicable, the inventive system facilitates the transaction between the user and the service provider. This may be in the form of an online transaction or simply the presentation of contact details.

The invention advantageously provides a diverse application platform that assists the user in making the most informed decision and monitoring the effectiveness of that decision over any given length of time.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method of locating a relevant product via a computer network, the method comprising:
   receiving at a client computer a search topic from a user;
   receiving at the client computer one or more attributes associated with the topic;
   assigning a rating to at least one of the attributes with the client computer;

with a server, locating at one or more information locations at least two separate instances of the topic;
locating, with the server, at least two information fields, each field related to one of the instances of the topic; and
with at least one of the client computer and the server:
associating content in at least two of the information fields with at least one of the attributes;
comparing the content in each of the at least two information fields associated with an attribute against each other;
assigning a score to the content of each compared instance of content based on the comparing;
prioritizing the attributes; and
ranking the located instances of the topic based on the prioritizing and the score of content associated with the topic.

2. The method according to claim 1, which further comprises carrying out the attribute step by at least one of:
receiving inputs from a user;
searching data stored during the user's previous session;
searching a database of user attributes; and
assigning default values.

3. The method according to claim 1, wherein at least one of the attributes comprises a geographical location.

4. The method according to claim 1, which further comprises selecting the two or more information locations to search based at least in part on at least one of the attributes.

5. The method according to claim 1, further comprising:
displaying by rank one or more of the ranked instances of the topic.

6. The method according to claim 1, further comprising:
updating the ranking of the instances of the topic in response to receiving a change to a priority of at least one of the attributes.

7. The method according to claim 1, further comprising:
receiving a user rating of a product; and
ranking the plurality of results of the searching based at least in part on the user rating.

8. The method according to claim 1, further comprising:
automatically updating the ranking based on a change to at least one of the information fields.

9. A system for locating a relevant product, the system comprising:
a client computer including at least one processor and at least one memory, the memory of the client computer including computer program instructions configured to be executed by the processor of the client computer to:
receive a search topic from a user;
receive one or more attributes associated with the topic; and
assign a rating to at least one of the attributes;
a server communicatively coupled to the client computer, the server including at least one processor and at least one memory, the memory of the server including computer program instructions configured to be executed by the processor of the server to:
locate at one or more information locations at least two separate instances of the topic; and
locate at least two information fields, each field related to one of the instances of the topic,
wherein the computer program instructions of at least one of the client computer and the server include instructions to:
associate content in each of at least two of the information fields with at least one of the attributes;
compare the content in each of the at least two information fields associated with an attribute against each other;
assign a score to the content of each compared instance of content based on the comparing;
prioritize the attributes; and
rank the located instances of the topic based on the prioritizing and the score of content associated with the topic.

10. The system according to claim 9, wherein the computer program instructions of the client computer include instructions to receive the one or more attributes associated with the topic by at least one of:
receiving inputs from a user;
searching data stored during the user's previous session;
searching a database of user attributes; and
assigning default values.

11. The system according to claim 9, wherein at least one of the attributes comprises a geographical location.

12. The system according to claim 9, wherein the computer program instructions of at least one of the server and the client computer include instructions to select the two or more information locations searched based at least in part on at least one of the attributes.

13. The system according to claim 9, wherein the computer program instructions of the client computer include instructions to display by rank one or more of the ranked instances of the topic.

14. The system according to claim 9, wherein the computer program instructions of the client computer include instructions to update the ranking of the instances of the topic in response to receiving a change to a priority of at least one of the attributes.

15. The system according to claim 9, wherein the computer program instructions of the client computer include instructions to:
receive a user rating of a product; and
rank the plurality of results of the searching based at least in part on the user rating.

16. A method of locating a credit-card product via a computer network, the method comprising:
receiving one or more attributes associated with at least one of a user and a desired credit card product;
locating two or more remote information locations that contain separate instances of the desired credit card product;
locating, at each of the remote information locations, an information field related to one of the instances of the credit card product;
associating content in each of at least two of the information fields with at least one of the attributes;
scoring an attribute associated with a first located product with an attribute associated with a second located product;
prioritizing the attributes; and
ranking a plurality of results of the searching based on the priority of the information fields.

17. The method according to claim 16, further comprising:
displaying a single credit-card product as a best match to the desired credit-card product based on the ranking.

18. The method according to claim 16, wherein the associating comprises:
correlating a property of a credit card product to at least one of the attributes.

19. A computer program product for locating a relevant product, the computer program product comprising:
a storage medium readable by a processing circuit and storing instructions for execution by the processing circuit for performing a method comprising:
receiving a search topic from a user;
receiving one or more attributes associated with the topic;
assigning a rating to at least one of the attributes;
locating at one or more information locations at least two separate instances of the topic;
locating at least two information fields, each field related to one of the instances of the topic;
associating content in each of at least two of the information fields with at least one of the attributes;
comparing the content in each of the at least two information fields associated with an attribute against each other;
assigning a score to the content of each compared instance of content based on the comparing;
prioritizing the attributes; and
ranking the located instances of the topic based on the prioritizing and the score of content associated with the topic.

20. The computer program product according to claim 19, which further comprises carrying out the attribute step by at least one of:
receiving inputs from a user;
searching data stored during the user's previous session;
searching a database of user attributes; and
assigning default values.

21. The computer program product according to claim 19, wherein the attributes comprise at least one of:
an income;
a credit score;
an amount of debt; and
a geographic location.

22. The computer program product according to claim 19, which further comprises selecting the two or more information locations to search based at least in part on at least one of the attributes.

23. The computer program product according to claim 19, further comprising:
displaying by rank one or more of the ranked instances of the topic.

24. The computer program product according to claim 19, further comprising:
updating the rank of the plurality of results in response to receiving a change to a priority of at least one of the attributes.

25. The computer program product according to claim 19, further comprising:
receiving a user rating of a product; and
ranking the plurality of results of the searching based at least in part on the user rating.

26. A method of locating a relevant product via a computer network, the method comprising:
receiving at a client computer location information;
receiving at the client computer a search topic from a user;
receiving one or more attributes associated with the user at the client computer;
assigning a value to each of the attributes associated with the user with the client computer;
receiving one or more attributes associated with the search topic at the client computer;
assigning a value to each of the attribute associated with the user with the client computer;
locating with a server two or more information locations that include the search topic and at least one information field at each location that is related to the topic, wherein the information locations conform to the location information; and
with at least one of the client computer and the server:
associating content in at least one of the information fields with at least one of the attributes;
comparing the content in the information field at a first of the located location to the content in the information field at a second of the located locations;
assigning a score to the content of each compared instance of content based on the comparing;
prioritizing the attributes; and
ranking the located instances of the topic based on the prioritizing and the score of content associated with the topic.

* * * * *